US012474116B2

(12) United States Patent
Momen et al.

(10) Patent No.: US 12,474,116 B2
(45) Date of Patent: Nov. 18, 2025

(54) VIBRATIONAL DRYING SYSTEM

(71) Applicant: Ultraosonic Technology Solutions, Knoxville, TN (US)

(72) Inventors: Ayyoub Mehdizadeh Momen, Knoxville, TN (US); Connor Jerric Shelander, Oak Ridge, TN (US); Jonathan S Bigelow, Knoxville, TN (US)

(73) Assignee: Ultraosonic Technology Solutions, Knoxville, TN (US)

( * ) Notice: Subject to any disclaimer, the term of this patent is extended or adjusted under 35 U.S.C. 154(b) by 745 days.

(21) Appl. No.: 17/722,193

(22) Filed: Apr. 15, 2022

(65) Prior Publication Data

US 2022/0333861 A1 Oct. 20, 2022

Related U.S. Application Data

(60) Provisional application No. 63/176,060, filed on Apr. 16, 2021.

(51) Int. Cl.
*F26B 15/18* (2006.01)
*F26B 5/02* (2006.01)
*F26B 25/00* (2006.01)

(52) U.S. Cl.
CPC ................ *F26B 15/18* (2013.01); *F26B 5/02* (2013.01); *F26B 25/003* (2013.01)

(58) Field of Classification Search
CPC ........... F26B 15/18; F26B 5/02; F26B 25/003
USPC ............................................................ 34/236
See application file for complete search history.

(56) References Cited

U.S. PATENT DOCUMENTS

| | | | | | |
|---|---|---|---|---|---|
| 1,777,972 | A * | 10/1930 | Hurxthal | F26B 17/023 | 34/223 |
| 2,395,834 | A * | 3/1946 | Bald | F26B 15/085 | 34/67 |
| 2,679,699 | A * | 6/1954 | Linderoth, Jr. | C14B 1/58 | 34/228 |
| 6,173,508 | B1 * | 1/2001 | Strohmeyer, Jr. | F23G 7/001 | 34/76 |
| 6,233,841 | B1 * | 5/2001 | Beach | F26B 21/086 | 34/418 |
| 7,024,794 | B1 * | 4/2006 | Mynes | B29B 9/16 | 34/59 |
| 7,647,708 | B2 * | 1/2010 | Christoffersen | B27N 3/143 | 34/640 |
| 7,987,613 | B2 * | 8/2011 | Ness | C10L 9/08 | 34/138 |
| 8,215,028 | B2 * | 7/2012 | Eia | E21B 21/066 | 34/142 |
| 10,302,358 | B2 * | 5/2019 | Fujimori | A47J 27/16 | |
| 11,384,980 | B2 * | 7/2022 | Triglia, Jr. | F26B 13/008 | |

(Continued)

FOREIGN PATENT DOCUMENTS

| | | | | |
|---|---|---|---|---|
| TW | 201348471 A * | 12/2013 | B22D 11/003 |
| WO | WO-2013133976 A1 * | 9/2013 | B22D 11/003 |

*Primary Examiner* — Stephen M Gravini

(57) ABSTRACT

A dryer includes piezoelectric elements powered by oscillatory voltage. The unique piezoelectric elements are placed on the conveyor system or drums moving with the wet material. The oscillating voltage is uniquely connected to the moving piezoelectric elements. The vibration of the piezoelectric elements extracts liquid from the wet material in the form of a cold mist that can be vented, captured, reclaimed, or drained.

18 Claims, 5 Drawing Sheets

(56) References Cited

U.S. PATENT DOCUMENTS

| | | | | |
|---|---|---|---|---|
| 12,109,311 | B2 * | 10/2024 | Slocum | H02N 15/00 |
| 2022/0333861 | A1 * | 10/2022 | Momen | F26B 25/003 |

* cited by examiner

VIBRATIONAL DRYING SYSTEM

FIELD OF THE INVENTION

The present invention relates generally to a drying system. More specifically, the present invention relates to a novel system for vibrational drying of wet material moving on a conveyor system, belts, or drums.

BACKGROUND OF THE INVENTION

A system for vibrational drying of wet material moving on a conveyor, rollers, or any kind of moving bed is in demand. Thermal drying is responsible for 10-25% of national industrial/manufacturing energy use in developed countries. Conventional thermal/evaporative drying is very energy-intensive because it requires water to be evaporated. Because of the large latent heat involved in evaporating water, a great deal of energy is needed to dry wet materials.

Conventional non-evaporative methods (mechanical dewatering) are widely used in various industries to dewater material without heat as much as possible. These include press drying, centrifugal drying, and vacuum drying (blasting droplets away using high-speed jets of air).

Although these processes are very energy-efficient, they have significant limitations. Their drying range is limited to dryness of ~50%, below which they function poorly or intense mechanical stress risks unwanted deformation or damage to products.

In residential washing machines, for example, the high-spin cycle dewaters clothes only to 57% moisture content. Industrial paper drying machines do everything possible to remove water from paper mechanically, down to about 50%, before thermal drying commences. As a rule of thumb, every 1% of paper drying accomplished mechanically equates to a 5% energy efficiency gain in the overall paper drying process. Thus, there is a need to develop a device that solves these problems.

The present invention is intended to address problems associated with and/or otherwise improve on conventional systems and devices through an innovative drying device that is designed to provide a convenient and effective means of drying wet items while incorporating other problem-solving features.

DETAIL DESCRIPTIONS OF THE INVENTION

All illustrations of the drawings are for the purpose of describing selected versions of the present invention and are not intended to limit the scope of the present invention.

Figure 1:
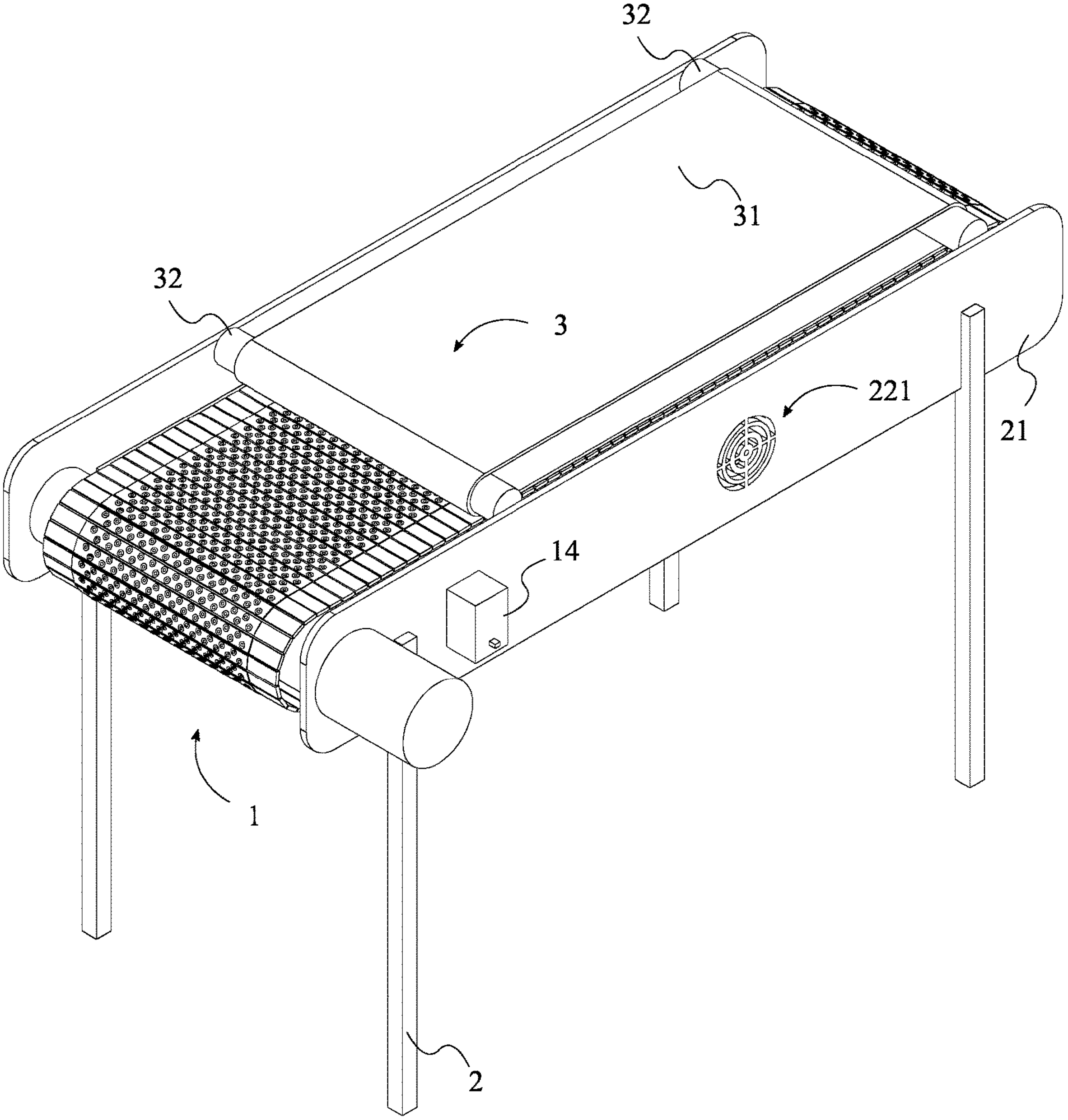
FIG. 1 is a perspective view of the present invention.

The present invention is a vibrational drying system that removes liquid from any material placed upon. As shown in FIG. 1, the present invention comprises a dryer 1, a back pressure mechanism 3 and a frame 2. The back pressure mechanism 3 is a conveyor mechanism that presses the wet material to the dryer 1. The frame 2 is a metal structure that secures the back pressure mechanism 3 to the dryer 1. The dryer 1 further comprises a power delivery belt 11, a plurality of links 12, a plurality of graphite shoe pulleys 13 and a controller 14. The power delivery belt 11 is a delivery system that provides DC power for plurality of links 12. The plurality of links 12 is a rectangular member that creates a conveyor system when fastened together. The plurality of links 12 can be a flat belt that creates a conveyor system. The plurality of links 12 can be also mounted on the exterior or interior of drum or rollers for some applications. In an alternative embodiment the plurality of links 12 is designed as one continuous belt on which the components are mounted. The plurality of graphite shoe pulleys 13 is a cylindrical member that provides power for the power delivery belt 11. The controller 14 is a device that controls various output factors to the plurality of links 12. The frame 2 further comprises a plurality of conveyor sides 21, a motor 22, and a power source 23. The plurality of conveyor sides 21 is an elongated metal member that secures the dryer 1. The back pressure mechanism 3 comprises a conveyor belt 31 and a plurality of rollers 32. The dryer 1 is positioned within the frame 2 and below the back pressure mechanism 3.

Figure 2:
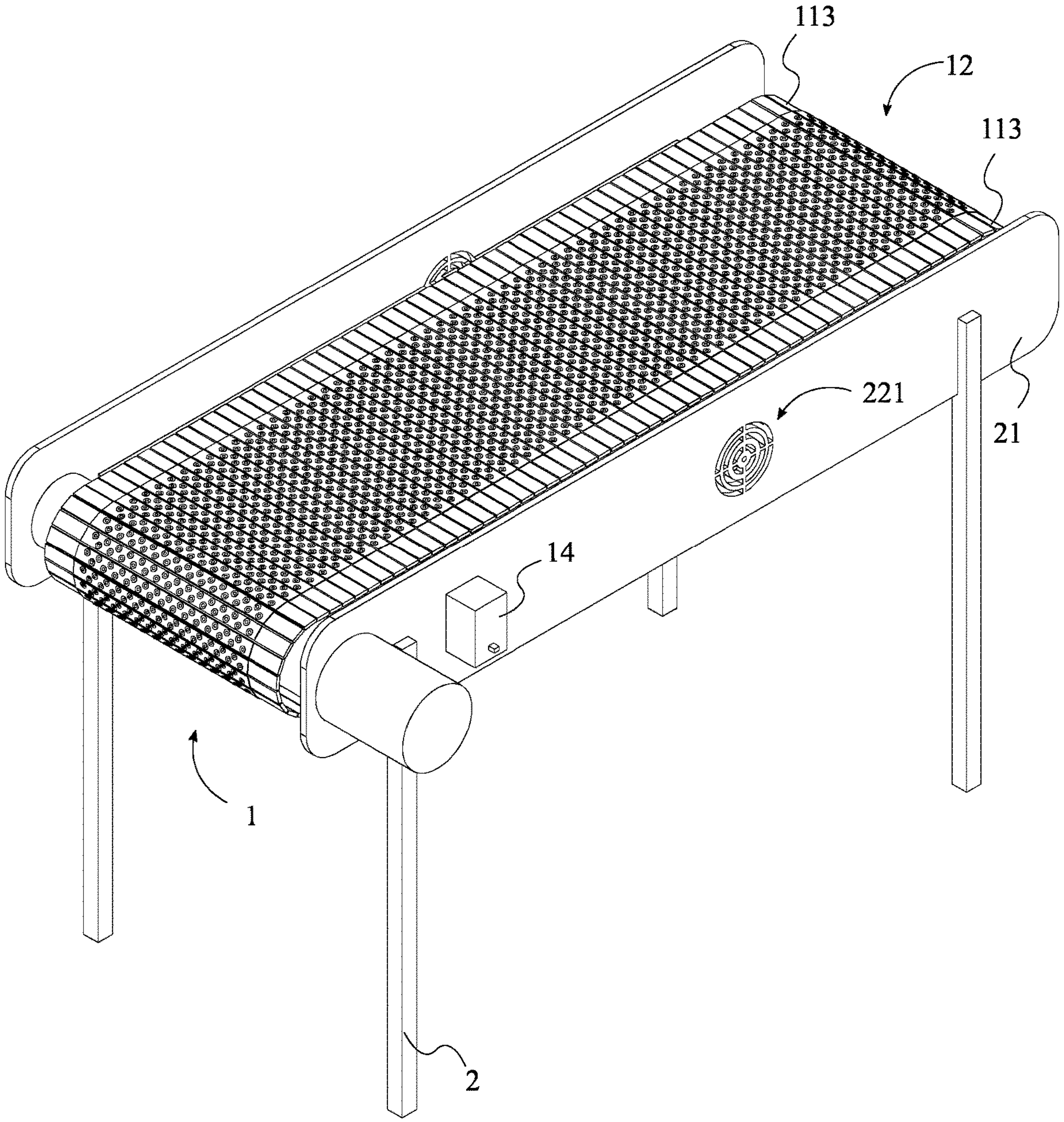
FIG. 2 is a perspective view of the present invention without the back pressure mechanism.

Furthermore, the present invention comprises a dryer 1 as seen in FIG. 2. The dryer 1 is in direct contact with a wet material. As, a result liquid is easily removed from the wet material with a high efficiency. The power delivery belt 11 comprises a plurality of belts 111, a plurality of fasteners 112, a plurality of printed circuit boards (PCBs) 113, a plurality of wires, and a plurality of amplifiers. The plurality of belts 111 is designed with a conductive material that conducts power from the plurality of graphite shoe pulleys 13 to the plurality of PCBs 113. The plurality of belts 111 is preferably designed with a copper material. The plurality of PCBs 113 are small shaped printed circuit boards that receive power. The plurality of wires 114 is JST fastened to electrical connectors. The plurality of links 12 comprises a plurality of piezoelectric elements 121, a plurality of washers 122, and a plurality of holes 123. The plurality of graphite shoe pulleys 13 comprises a plurality of shoe interfaces 131, a slip ring interface 132, and a V-belt pulley 133. The plurality of shoe interfaces 131 is a graphite shoe slot that delivers power to the power delivery belt 11. The slip ring interface 132 is a power transmitter that translates power from a stationary frame 2 of reference to a rotating one. The controller 14 is in control of the amplitude, frequency, duty cycle, number of pulses delivered, and resonance seeking capabilities. As a result, the controller 14 can manage the speed, efficiency, and strength at which a wet material is dried.

In reference to FIG. 2, the vibrational drying system comprises the plurality of links 12 that comprises a solid or porous material. Consequently, the plurality of links 12 allows a liquid to flow through to leave the wet material. The plurality of conveyor sides 21 comprises a vent 211. The vent 211 is a spinning fan that expels mist out of the present invention. The back pressure system enhances the contact with the wet material. Accordingly, the back pressure system ensures the wet material touches the vibrating plurality of piezoelectric elements 121.

In reference to FIG. 2, the vibrational drying system easily expands to allow for a higher drying production with a smaller volume footprint. The dryer 1 stacks horizontally or vertically to increase drying capacity. Thus, the dryer 1 can stack several layers high to efficiently dry a material without having to increase the available space. The plurality of links 12 comprises a metallic or nonmetallic material. The plurality of piezoelectric elements 121 is fastened to the plurality of links 12. So, the plurality of piezoelectric elements 121 moves along the conveyor system along with the plurality of links 12. The plurality of links 12 is installed inside the conveyor belt 31. The plurality of links 12 is installed outside the conveyor belt 31. As a result, the plurality of links 12 rotates around the dryer 1. The plurality of links 12 is installed inside the plurality of rollers 32. The plurality of links 12 is installed outside the plurality of rollers 32. Therefore, the plurality of links 12 rotates around the plurality of rollers 32 positioned along the dryer 1. The plurality of links 12 is installed inside a drum. The plurality of links 12 is installed outside a drum. In a particular configuration, the dryer 1 is also able to follow curved surfaces, circles, or semi circles. When installed on the drum or roller the dryer 1 can dry wet material such as pulp and paper or other material. When installed inside the tumble dryer drum, the system can dry garment and clothing.

Additionally, the plurality of holes 123 is spaced along the plurality of links 12. Also, plurality of holes 123 is spaced on a piezoelectric bimorph membrane usually made of stainless steel. As a result, the plurality of holes 123 and piezoelectric center holes ensures liquid can pass through from the wet material and into the present invention. The plurality of holes 123 has a cylindrical shape. Consequently, the liquid can easily traverse through the plurality of holes 123. In an alternative embodiment the plurality of holes 123 is designed with a cylindrical or conical shape. The plurality of amplifiers 115 circuit board sits behind the plurality of PCB boards 113. Each of the PCB boards 113 receiving DC voltage from the plurality of amplifiers 115 and convert it to high frequency power to drive the plurality of piezoelectric elements 121. In reference to FIG. 4, the plurality of piezoelectric elements 121 is a disk shape. In an alternative embodiment the piezoelectric elements 121 is designed with a large continuous perforated plate with plurality of piezoelectric elements 121 attached to the back of the perforated plate. Accordingly, the plurality of piezoelectric elements 121 vibrates easily at a high frequency shaking the wet material placed on top. In an alternative embodiment the plurality of piezoelectric elements 121 is designed with a ring, tape, rectangular, square, plate or circle shape.

Figure 5:
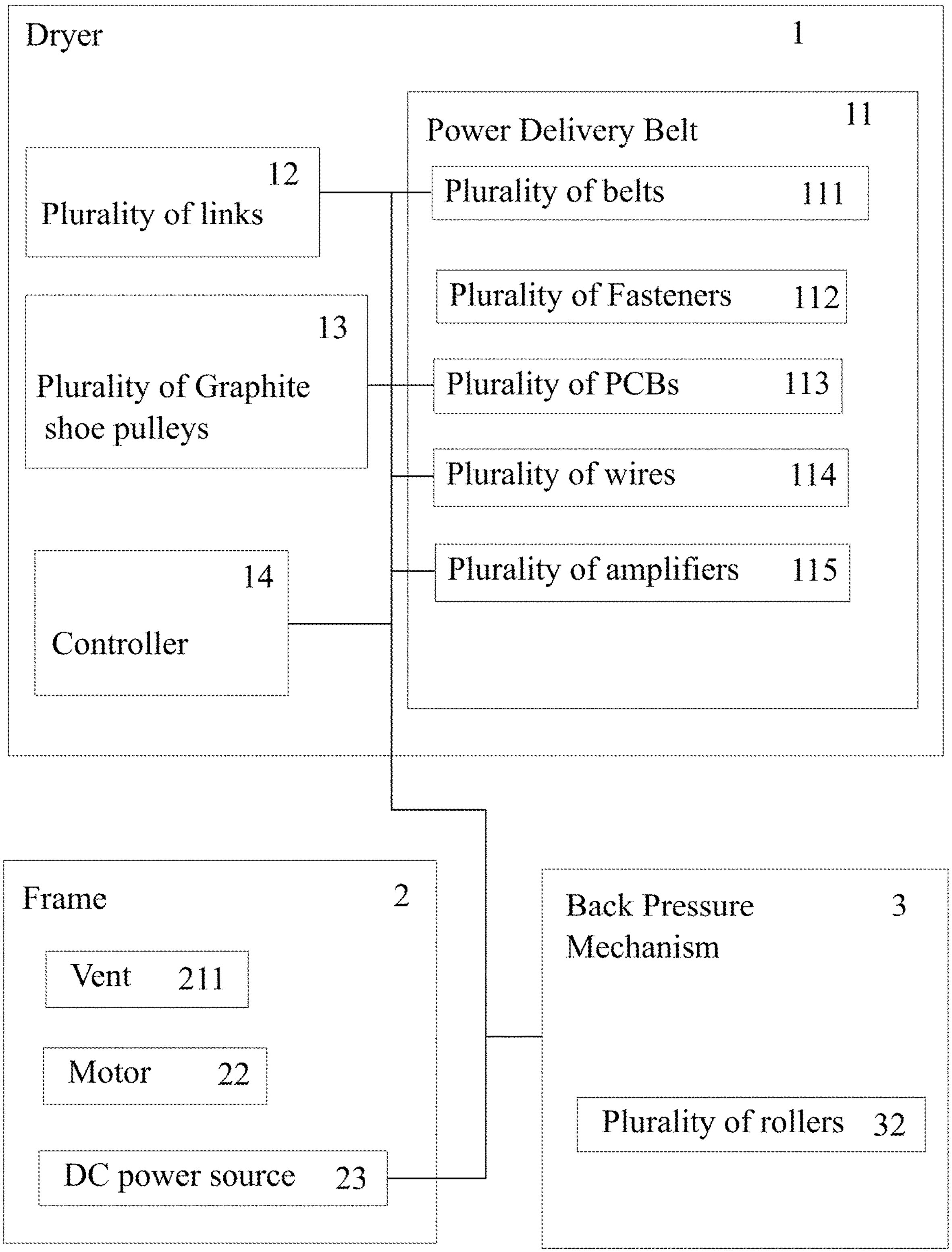
FIG. 5 is an illustration of the electrical connections of the present invention.

In reference to FIG. 5, the plurality of piezoelectric elements 121 is electrically connected to the plurality of amplifiers 1115 which are powered by the power source 23. Thus, the plurality of piezoelectric elements 121 vibrates at a high frequency when power is provided from the amplifier circuit boards which are powered by power source 23. The power source 23 produces a single pole, bi-polar oscillating voltage, or a burst width modulating oscillating voltage. So, the power source 23 provides a sinusoidal, square, ramp or variation thereof of voltage. The power source 23 sends multiple pulses at the resonance frequencies of the plurality of piezoelectric elements 121 and give a pause for a certain period to help improve efficiency while the wet material is not in direct contact with the surface of piezoelectric transducers. The power source 23 seeks the resonance frequency during the operation and find the best operating frequency. The vent 211 evacuates the built-up mist within the present invention. So, the vent 211 utilizes airflow to draw the mist or high humidity air within the present invention to the surrounding air outside. Further, in an alternative embodiment the mist exiting can be placed within a retention container for later use.

Figure 3:
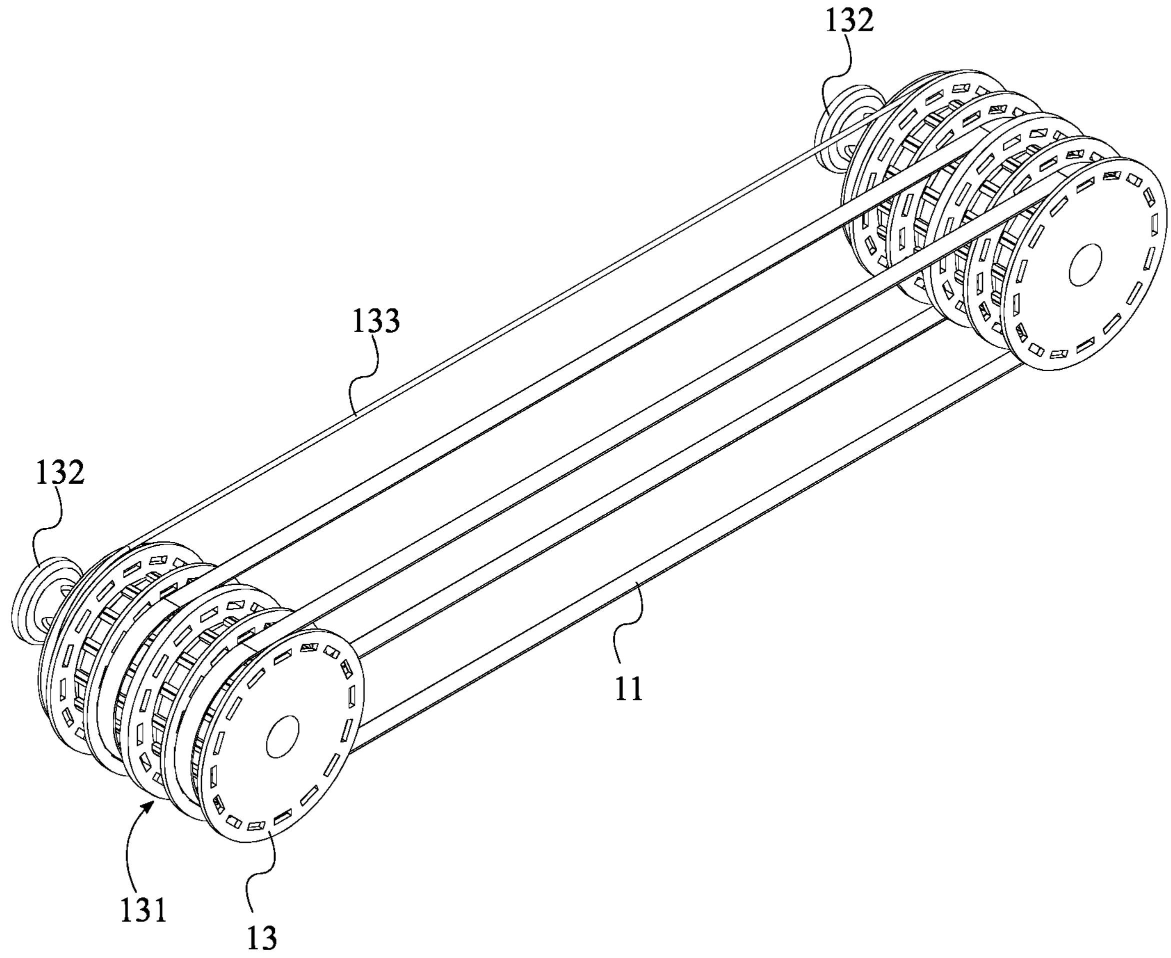
FIG. 3 is a perspective view of the power deliver belt coupled to the plurality of graphite shoe pulleys.

Further, the plurality of belts 111 is electrically connected to the plurality of graphite shoe pulleys 13 as shown in FIG. 3. As a result, the plurality of belts 111 receives electrical power from the plurality of graphite shoe pulleys 13. The plurality of fasteners 112 secures the plurality of PCBs 113 to the plurality of belts 111. Consequently, the plurality of fasteners 112 ensures the plurality of PCBs 113 move and rotate around the present invention in sync with the plurality of belts 111. The plurality of wires 114 electrically connects the plurality of belts 111 to the plurality of PCBs 113. Accordingly, the plurality of wires 114 provides the plurality of PCBs 113 with power from the plurality of belts 111. The plurality of amplifiers 115 is electrically connected to the plurality of PCBs 113. Thus, the plurality of amplifiers 115 can regulate the incoming voltage to the plurality of PCBs 113. In an alternative embodiment, the polarity of the spring-loaded connectors, graphite, conductive ball bearing, can deliver power to the moving plurality of linkages from stationary power amplifier.

Figure 4:
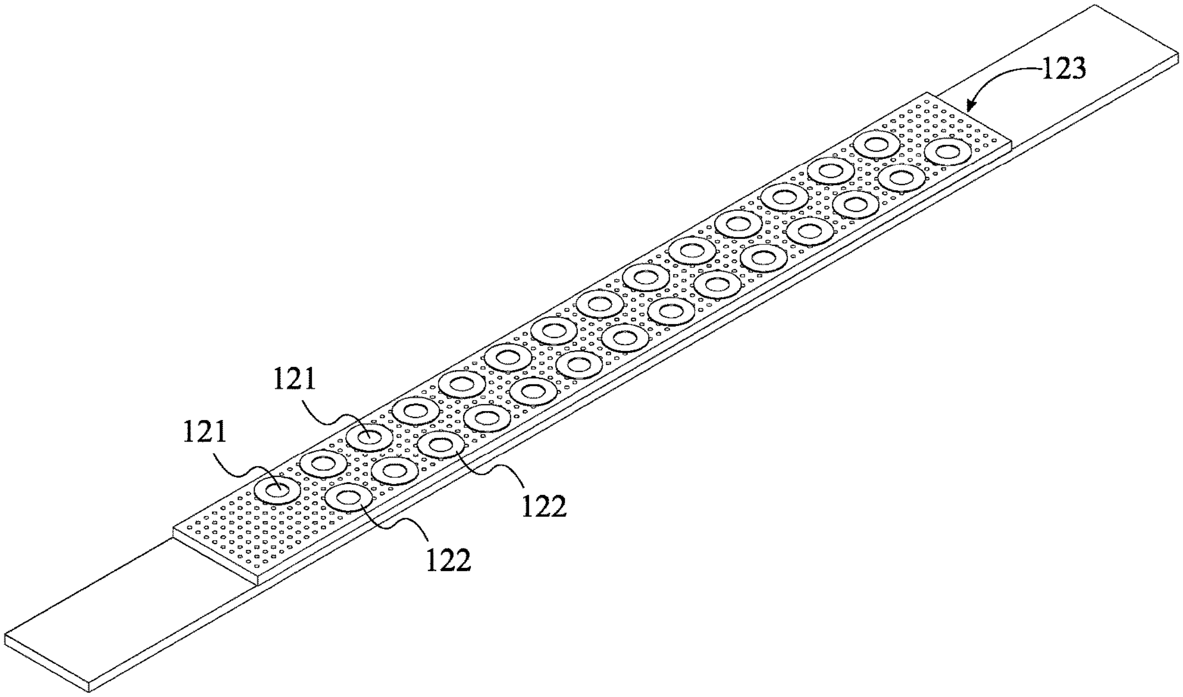
FIG. 4 is a close-up view of one of the plurality of links.

Furthermore, the plurality of piezoelectric elements 121 is secured to the plurality of links 12 as seen in FIG. 4. So, the plurality of piezoelectric elements 121 moves around the present invention along with the plurality of links 12. The plurality of washers 122 secures the plurality of piezoelectric elements 121 to the plurality of links 12. The plurality of piezoelectric elements 121 vibrates rapidly. Consequently, the plurality of piezoelectric elements 121 vibrates at a high frequency to shake the water off any wet material in contact with it. The plurality of holes 123 allows water to pass through leaving the wet material. Accordingly, the plurality of holes 123 serves as drainage areas for liquid being removed from the wet material.

In reference to FIG. 3, the plurality of shoe interfaces 131 is rotatably coupled with the power delivery belt 11. Thus, as the plurality of shoe interfaces 131 rotates the power delivery belt 11 rotates in sync. The slip ring interface 132 is electrically coupled to the power source 23. In an alternative embodiment, the slip ring interface 132 and power delivery belt 11 can receive a high frequency alternating voltage to drive the plurality of piezoelectric elements 121. The V-belt pulley 133 mechanically connects two of the plurality of graphite shoe pulleys 13 together. As a result, the V-belt pulley 133 rotates the plurality of graphite shoe pulleys 13 simultaneously, requiring the plurality of graphite shoe pulleys 13 to be connected to only one motor 22. In an alternative embodiment, the polarity of the spring-loaded connectors, graphite, conductive ball bearing, can deliver power to the moving plurality of linkages from stationary power amplifier.

In reference to FIG. 1, the motor 22 being mounted offset the frame 2. Thus, the motor 22 does not interfere with the rotating components within the present invention. The plurality of conveyor sides 21 is positioned adjacent the frame 2 offset the dryer 1. So, the plurality of conveyor sides 21 secures various components and allows for mist to easily be extracted from within the present invention.

In reference to FIG. 1, the plurality of rollers 32 is terminally connected to the back pressure mechanism 3. As a result, the plurality of rollers 32 serves as the end points for the back pressure mechanism 3. The conveyor belt 31 is mechanically coupled around the plurality of rollers 32. Consequently, the conveyor belt 31 rotates around the plurality of rollers 32 pressing any wet material onto the dryer 1.

Although the invention has been explained in relation to its preferred embodiment, it is to be understood that many other possible modifications and variations can be made without departing from the spirit and scope of the invention as hereinafter claimed.

What is claimed is:

1. A vibrational drying system comprising:
a dryer;
a back pressure mechanism;
a frame;
the dryer comprising a power delivery belt, a plurality of links, a plurality of graphite shoe pulleys, and a controller;
the frame comprising a plurality of conveyor sides, a motor, and a power source;
the back pressure mechanism comprising a conveyor belt and a plurality of rollers;
the dryer being positioned within the frame and below the back pressure mechanism;
the dryer being in direct contact with a wet material;
the power delivery belt comprising a plurality of belts, a plurality of fasteners, a plurality of printed circuit boards (PCBs), a plurality of wires, and a plurality of amplifiers;
the plurality of links comprising a plurality of piezoelectric elements, a plurality of washers, and a plurality of holes;
the plurality of graphite shoe pulleys comprising a plurality of shoe interfaces, a slip ring interface, and a v-belt pulley; and
the controller being in control of the amplitude, frequency, duty cycle, number of pulses delivered, and resonance seeking capabilities.

2. The vibrational drying system as claimed in claim 1 comprising:
the plurality of links comprising a solid or porous material;
the plurality of conveyor sides comprising a vent; and
a back pressure system enhancing contact with the wet material.

3. The vibrational drying system as claimed in claim 1 comprising:
the dryer being able to stack horizontally or vertically to increase drying capacity;
the plurality of links comprising a metallic or non-metallic material;
the plurality of piezoelectric elements being fastened to the plurality of links;
the plurality of links being installed inside the conveyor belt;
the plurality of links being installed outside the conveyor belt;
the plurality of links being installed inside the plurality of rollers;
the plurality of links being installed outside the plurality of rollers;
the plurality of links being installed inside a drum; and
the plurality of links being installed outside a drum.

4. The vibrational drying system as claimed in claim 1 comprising:
the plurality of holes being spaced along the plurality of links; and
the plurality of holes having a cylindrical or conical shape.

5. The vibrational drying system as claimed in claim 1, comprising the plurality of piezoelectric elements being a disk shape.

6. The vibrational drying system as claimed in claim 1 comprising:
the plurality of piezoelectric elements being electrically connected to the plurality of amplifiers powered by the power source; and
the plurality of amplifiers producing a single pole, bipolar oscillating voltage, or a burst width modulating oscillating voltage.

7. The vibrational drying system as claimed in claim 2, comprising the vent evacuating a built-up mist within the vibrational drying system.

8. The vibrational drying system as claimed in claim 1 comprising:
the plurality of belts being electrically connected to the plurality of graphite shoe pulleys;
the plurality of fasteners securing the plurality of PCBs to the plurality of belts;
the plurality of wires electrically connecting the plurality of belts to the plurality of PCBs; and
the plurality of amplifiers being electrically connected to the plurality of PCBs.

9. The vibrational drying system as claimed in claim 1 comprising:
the plurality of piezoelectric elements being secured to the plurality of links;
the plurality of washers securing the plurality of piezoelectric elements to the plurality of links;
the plurality of piezoelectric elements vibrating rapidly; and
the plurality of holes allowing water to pass through leaving the wet material.

10. The vibrational drying system as claimed in claim 1 comprising:
the plurality of shoe interfaces being rotatably coupled with the power delivery belt;
the slip ring interface being electrically coupled to a DC power source; and
the V-belt pulley mechanically connecting two of the plurality of graphite shoe pulleys together.

11. The vibrational drying system as claimed in claim 1 comprising:
the motor being mounted offset the frame; and
the plurality of conveyor sides being positioned adjacent the frame offset the dryer.

12. The vibrational drying system as claimed in claim 1 comprising:
the plurality of rollers being terminally connected to the back pressure mechanism; and
the conveyor belt being mechanically coupled around the plurality of rollers.

13. A vibrational drying system comprising:
a dryer;
a back pressure mechanism;
a frame;
the dryer comprising a power delivery belt, a plurality of links, a plurality of graphite shoe pulleys, a controller;
the frame comprising a plurality of conveyor sides, a motor, and a DC power source;
the back pressure mechanism comprising a conveyor belt and a plurality of rollers;
the dryer being positioned within the frame and below the back pressure mechanism;
the dryer being in direct contact with a wet material;
the power delivery belt comprising a plurality of belts, a plurality of fasteners, a plurality of printed circuit boards (PCBs), a plurality of wires, and a plurality of amplifiers;
the plurality of links comprising a plurality of piezoelectric elements, a plurality of washers, and a plurality of holes;

the plurality of graphite shoe pulleys comprising a plurality of shoe interfaces, a slip ring interface, and a v-belt pulley;

the controller being in control of the amplitude, frequency, duty cycle, number of pulses delivered, and resonance seeking capabilities;

the plurality of links comprising a porous material;

the plurality of conveyor sides comprising a vent; and a back pressure system enhancing contact with the wet material.

14. The vibrational drying system as claimed in claim 13 comprising:

the dryer being able to stack horizontally or vertically to increase drying capacity;

the plurality of links comprising a metallic material;

the plurality of piezoelectric elements being fastened to the plurality of links;

the plurality of links being installed inside the conveyor belt;

the plurality of links being installed outside the conveyor belt;

the plurality of links being installed inside the plurality of rollers;

the plurality of links being installed outside the plurality of rollers;

the plurality of links being installed inside a drum;

the plurality of links being installed outside a drum;

the plurality of holes being spaced along the plurality of links; and the plurality of holes having a cylindrical or conical shape.

15. The vibrational drying system as claimed in claim 13;

comprising the plurality of piezoelectric elements being a disk shape;

the plurality of piezoelectric elements being electrically connected to the plurality of amplifiers powered by the power source;

the plurality of amplifiers producing a single pole, bipolar oscillating voltage, or a burst width modulating oscillating voltage; and the vent evacuating built-up mist within the vibrational drying system.

16. The vibrational drying system as claimed in claim 13 comprising:

the plurality of belts being electrically connected to the plurality of graphite shoe pulleys;

the plurality of fasteners securing the plurality of PCBs to the plurality of belts;

the plurality of wires electrically connecting the plurality of belts to the plurality of PCBs;

the plurality of amplifiers being electrically connected to the plurality of PCBs;

the plurality of piezoelectric elements being secured to the plurality of links;

the plurality of washers securing the plurality of piezoelectric elements to the plurality of links;

the plurality of piezoelectric elements vibrating rapidly; and the plurality of holes allowing water to pass through leaving the wet material.

17. The vibrational drying system as claimed in claim 13 comprising:

the plurality of shoe interfaces being rotatably coupled with the power delivery belt;

the slip ring interface being electrically coupled to the DC power source; and the V-belt pulley mechanically connecting two of the plurality of graphite shoe pulleys together.

18. The vibrational drying system as claimed in claim 13 comprising:

the motor being mounted offset the frame;

the plurality of conveyor sides being positioned adjacent the frame offset the dryer;

the plurality of rollers being terminally connected to the back pressure mechanism; and the conveyor belt being mechanically coupled around the plurality of rollers.

* * * * *